No. 674,051. Patented May 14, 1901.
G. F. APPLEGATE.
EYEGLASSES OR SPECTACLES.
(Application filed Feb. 26, 1900.)
(No Model.)

WITNESSES:
Clifton C. Hallowell
E. L. Fullerton

INVENTOR:
GEORGE F. APPLEGATE,
by Arthur E. Paige,
Atty.

THE NORRIS PETERS CO., PHOTO-LITHO., WASHINGTON, D. C.

UNITED STATES PATENT OFFICE.

GEORGE F. APPLEGATE, OF TRENTON, NEW JERSEY.

EYEGLASSES OR SPECTACLES.

SPECIFICATION forming part of Letters Patent No. 674,051, dated May 14, 1901.

Application filed February 26, 1900. Serial No. 6,443. (No model.)

*To all whom it may concern:*

Be it known that I, GEORGE F. APPLEGATE, of Trenton, in the State of New Jersey, have invented certain new and useful Improvements in Eyeglasses or Spectacles, whereof the following is a specification, reference being had to the accompanying drawings.

My invention relates to a lens-clamp for eyeglasses or spectacles of the so-called "frameless" or "rimless" type which serves to maintain the lens in proper relation with the nose bridge and guard or other frame members. Such clamps are usually so shaped as to require two separate pieces for their construction: first, a strap arranged for direct attachment to the lens, and, second, a stud or shank provided with a seat for the respective overlapping ends of the nose bridge and guard. Said two clamp-pieces are separately manufactured by stamping and bending operations and are then permanently united by a soldering or brazing operation to form the two pieces into the single commercial article.

It is the object of my invention to provide a lens-clamp of such form as to be readily manufactured of a single stamping of sheet metal, as hereinafter described.

My invention is obviously advantageous in that the expensive operation of brazing hitherto employed, as aforesaid, in the manufacture of lens-clamps of the class specified may be eliminated and the cost or production thereof be correspondingly reduced.

Figure 1:
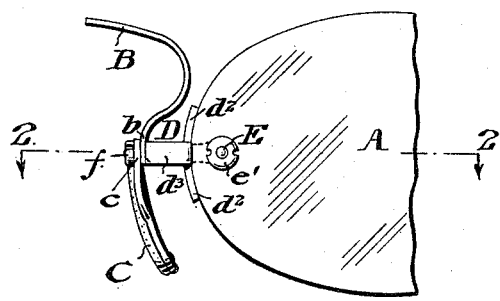
Figure 3:
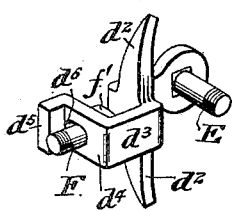
Figure 4:
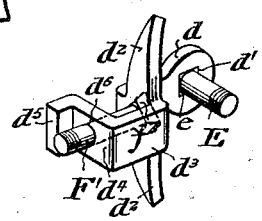
Figure 2:
Figure 5:
Figure 6:
Figure 8:
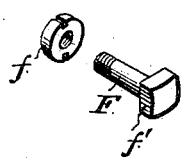
Figure 7:
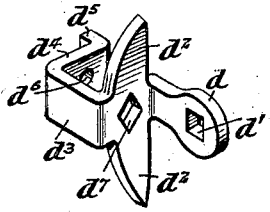
Figure 9:
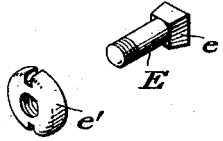
Figure 10:
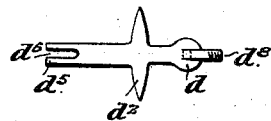

In the drawings, Figure 1 is a fragmentary front view of an eyeglass embodying my invention. Fig. 2 is a sectional view taken on the line 2 2 of Fig. 1. Fig. 3 is a perspective view of the form of my clamp shown in full lines in Fig. 2. Fig. 4 is a perspective view of the form of my clamp shown in dotted lines in Fig. 2. Fig. 5 is a face view of the blank from which the clamp shown in Fig. 3 is formed. Fig. 6 is a face view of the blank from which the clamp shown in Fig. 4 is formed. Fig. 7 is a perspective view of the form of clamp shown in Fig. 4. Fig. 8 is a perspective view of a bolt and nut for securing the nose bridge and guard upon the clamp-seat. Fig. 9 is a perspective view of a bolt and nut for securing the lens with respect to the clamp-strap. Fig. 10 is a face view of a blank for a modified form of my improved clamp.

In said figures, A is the lens, and B C the nose bridge and guard, of ordinary construction. The clamp D, which serves to connect said lens and nose bridge and guard in proper relation, comprises a strap end $d$, which bears against the face of the lens A, as shown in Fig. 2, and is secured thereon by means of the bolt E, whose head $e$ is seated in the aperture $d'$ in the clamp end. Said bolt E extends through the lens-aperture $a$ and is provided with the nut $e'$. Immediately adjoining the strap end $d$ the clamp-body is provided with wings $d^2$, arranged to engage the edge of the lens, as shown in Fig. 1, and the clamp-body is bent at right angles with the winged portion to form the shank $d^3$. Immediately adjoining said shank the body of the clamp is bent parallel with the winged portion to form the seat $d^4$ for the respective overlapping ends $b$ $c$ of the nose bridge and guard, and the clamp end $d^5$, adjoining said seat $d^4$, extends at right angles to said seat and parallel with the opposite strap end $d$ to maintain the overlapped ends of the bridge and guard in proper relation upon the seat $d^4$, to which they may be secured by means of the bolt F, provided with the nut $f$, as shown in Fig. 2.

In the form of my invention shown in Figs. 3 and 5 the aperture $d^6$ in the clamp-seat $d^4$ is elongated to facilitate the entrance of the bolt F, and the latter is prevented from rotating when the parts are assembled, as shown in Fig. 2, by the contact of the side of its head $f'$ with the adjacent surface of the clamp-shank $d^3$ within the rectangular bight formed in the clamp-body by the bends above described.

In the form of my invention shown in Figs. 4 and 6 the aperture $d^9$ may be circular, as shown in Fig. 6, for said bolt extends across the rectangular bight in the clamp and has its pyramidal head $f^2$ seated in the similarly-shaped aperture $d^7$ in the winged portion of the clamp. The bolt F' being entered from the lens side of the clamp, the engagement of its head in the aperture $d^7$ serves to prevent the rotation of the bolt with respect to the clamp.

Although I prefer to construct the bolt E, as shown in Fig. 9, separate from the clamp and to prevent the rotation of said bolt with respect to the clamp by the engagement of its pyramidal head $e$ in the similarly-shaped aperture $d'$ in the clamp, it is obvious that other means may be employed to secure the lens in proper relation with the clamp. For instance, the end $d^8$ of the plane clamp-blank shown in Fig. 10 may be slitted, as shown, upturned at right angles to the plane of the strap $d$, and threaded at its extremity to receive the nut $e'$. It is also obvious that the aperture $d^{10}$ may be extended to the edge of the clamp-body, as shown in Fig. 10.

I do not desire to broadly claim an ordinary lens-clamp formed of sheet metal or sheet-metal stampings. I believe it to be new, however, to provide a lens-clamp of the characteristic construction hereinbefore described which is adapted for manufacture from a single piece of metal, and therefore I do not desire to limit myself to the precise proportions or arrangement of the parts which I have illustrated, as it is obvious that various modifications may be made therein without departing from the spirit of my invention.

I claim—

1. A lens-clamp, consisting of a single sheet-metal stamping bent to form both a strap arranged for direct engagement with the lens, and a seat arranged for direct engagement with a nose-bridge, a bolt extending through an aperture in said seat, and means in said clamp to prevent the rotation of said bolt, substantially as set forth.

2. A lens-clamp, consisting of a sheet-metal plate having parallel plane ends and a rectangularly-bent bight intermediate of said ends, one side of said bight being provided with wings arranged to engage the edge of the lens, and the opposite side of said bight being provided with a seat arranged to retain the respective ends of a nose bridge and guard in proper relation, respective apertures in the opposed winged and seat portions of said clamp, a bolt extending through said apertures, and means, in said clamp, to prevent the rotation of said bolt, substantially as set forth.

3. A lens-clamp, consisting of a sheet-metal plate having parallel plane ends and a rectangularly-bent bight intermediate of said ends, one side of said bight being provided with wings, arranged to engage the edge of the lens, and the opposite side of said bight being provided with a seat arranged to retain the respective ends of an ordinary nose bridge and guard in proper relation, an aperture in the seat portion of said clamp, a screw-threaded bolt entered through said aperture, and a head upon said bolt so shaped as to prevent the rotation of said bolt, substantially as set forth.

4. In an eyeglass the combination with a lens, of an aperture in said lens, a screw-threaded member extending through said aperture in engagement with the strap end of a lens-clamp, a portion of said clamp bent at right angles with said strap end and having wings bearing upon the edge of the lens, a shank portion of said clamp extending at right angles with said winged portion, at one side thereof, a seat portion of said clamp bent parallel with said winged portion and provided with an aperture, a bridge and a guard having their adjoining ends overlapped upon said clamp-seat, a screw-threaded member entered through said bridge, said guard and said aperture in said seat, and an end portion of said clamp bent at right angles with said seat, arranged to retain the respective overlapped ends of said bridge and guard in proper relation, substantially as set forth.

5. A lens-clamp consisting of a single sheet-metal stamping, a strap $d$, at one end of said clamp arranged for direct engagement with a lens, opposed wings $d^2$, extending at right angles with said strap, in position to engage the edge of the lens, a shank $d^3$, parallel with said strap $d$, a nose bridge and guard seat $d^4$, bent at right angles with said shank $d^3$, and a plane extremity $d^5$, parallel with said strap $d$, substantially as set forth.

GEORGE F. APPLEGATE.

Witnesses:
G. H. CAIN,
JOHN F. PFISTER.